March 21, 1933. M. P. SHIELDS 1,902,732
METHOD OF AND APPARATUS FOR ECONOMIZING FEED WATER
Filed Oct. 31, 1929
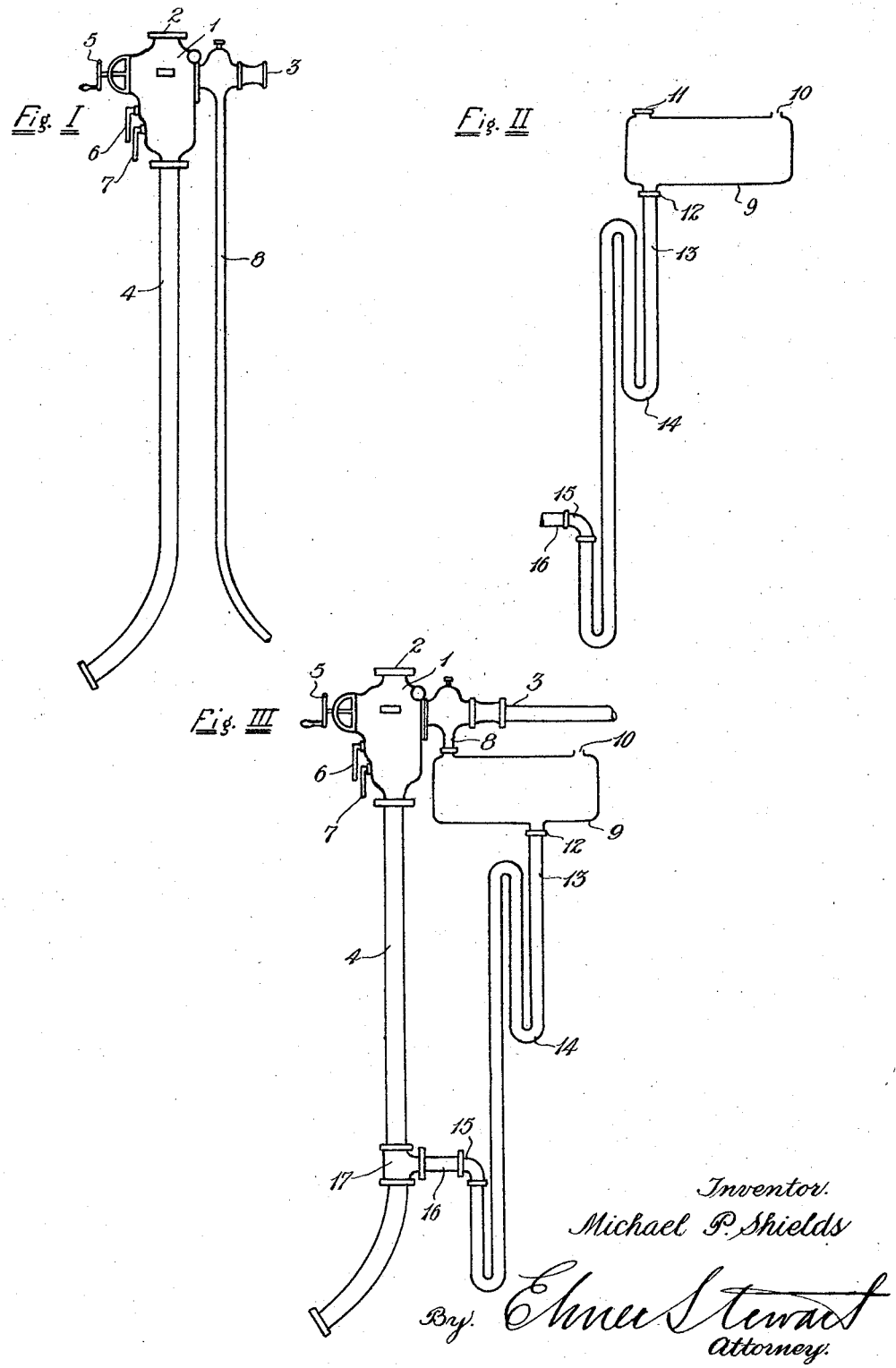
Inventor.
Michael P. Shields
By Elmer Stewart
Attorney.

Patented Mar. 21, 1933

1,902,732

UNITED STATES PATENT OFFICE

MICHAEL P. SHIELDS, OF QUEBEC, QUEBEC, CANADA

METHOD OF AND APPARATUS FOR ECONOMIZING FEED WATER

Application filed October 31, 1929. Serial No. 403,843.

This invention relates to improvements in a method of and apparatus for economizing feed water and is particularly applied to the prevailing systems of delivering supplies of feed water as demanded to a locomotive boiler.

In ordinary prevailing practice injectors used for the purpose of feeding water to a steam boiler cause a certain waste of a portion of this water before delivery is actually made to the inlet of the boiler. This waste occurs when the valves are open and the injector starts operation but before sufficient energy has been developed to cause the feed water to pass through the water inlet pipes. Under such circumstances the steam which forms the motive power mixes with a portion of the water and therefore loses its heat and the resultant stream must be drained away usually to a waste pipe. Where this water is drained away it frequently is a source of much annoyance and nuisance as for example with a locomotive in freezing weather, this waste is delivered on the roadbed and may produce ice on the tracks.

It is an object of my invention to provide a method by which with the equipment already approved and adopted in boiler practice, the feed water may be economized, preventing any waste whatever.

It is also an object of my invention to provide means readily adapted to standard equipment for trapping any water which would otherwise be wasted and returning the same to the source of feed water.

It is an incidental result of my invention that the steam used for water feeding purposes and which in part is wasted in heating the waste water shall by reason of my improvement be conserved in heating this portion of the water which is returned to the system.

It will be apparent that such a method as I have described here may be applied to economize the feeding of water to a boiler irrespective of whether the installation is on a locomotive, a portable plant or part of a permanent heating system as the details are limited to the injector, its outlet and its source of supply. This is independent of the plant conditions in which the injector is used for water feeding purposes.

By way of illustration of the preferred means by which my invention is practiced I have shown in the accompanying drawing;

Fig. I the usual injector as adapted for use of the invention;

Fig. II the receiving tank and return pipe and;

Fig. III the complete assembly of economizing means on the injector.

The injector 1 consists in general of a metal casting upon which are provided the usual steam inlet 2, water delivery pipe 3 and water supply pipe 4. The latter is connected to a source of supply not illustrated.

The customary controls for an injector of this type are a steam valve 5 and water control valves 6 and 7.

A waste pipe 8 is provided as a part of the water delivery pipe 3. In ordinary practice this waste pipe may form a drain to any convenient location but is not adapted for return to the source of water supply.

A receiving tank 9 is provided of sufficient volume to accommodate the amount of water ordinarily wasted in the operation of starting the water feeding. This tank has a vent 10 to the atmosphere and a fitting 11 which serves to connect the tank to the waste pipe 8.

An outlet 12 from the tank 9 is also provided for draining the latter. A return pipe 13 shown to have a liquid seal or trap 14 which is arranged as part of the return pipe 13. The opposite end of the return pipe 13 has a fitting 15 which is connected by pipe 16 to a T-joint 17 which is inserted on the water supply pipe 4.

In operation the control pipes 6 and 7 are adjusted in the usual manner to permit the desired passage of feed water as it may be drawn by the injector. The action of the injector is created by opening the steam valve 5 in the usual manner.

During the first stage of the operation the water forced through the injector by the steam will not have sufficient pressure to be carried through the delivery pipe into the boiler and as a result will accumulate or be drawn off through the waste pipe. By providing the receiving tank 9 in place of the waste pipe and venting the tank to the atmosphere this heated waste water will be held in the receiving tank and fill the return pipe 13. The capacity of the tank is of course greater than the amount of waste water usually produced. As the injector stream is delivered through the delivery pipe the water is drawn from the water return pipe 13 and also the tank 9 is drained. The action of the injector is such as to practically exhaust the supply in the receiving tank during this operation.

When the injector is stopped there will be a slight return of water to the receiving tank 9 from the delivery pipe 3 and the feed water in supply pipe 4 will also pass through pipe 13 and reach its normal level in the pipes 4, 13 or possibly in the receiving tank 9.

It will therefore be evident that by this method the usual injector action is allowed to take place and the water which would otherwise be wasted either at the commencement or the end of the injector action will be economized through settling in the receiving tank 9 and thus return to the water supply as the same may be reached through supply pipe 14. It is also evident that all escape of steam through the waste pipe is prevented and this steam made to deliver its heat to whatever water passes into the receiving tank 9 from the injector.

While I have shown one preferred form of my invention numerous changes in minor details and proportions may be carried out without departure from the scope of the invention as defined in the following claims.

What I claim is:

1. The method of economizing feed water being injected into a boiler by a steam jet which consists in draining by gravity from the injector and against atmospheric pressure only, the mixed steam and water not delivered to the boiler when the injector is first operated, and thereafter, as soon as the feeding operation is effective, drawing the water so collected into the stream being fed into the boiler.

2. The method of economizing feed water being injected into a boiler by a steam jet which consists in draining by gravity from the injector and against atmospheric pressure only, the mixed steam and water not delivered to the boiler when the injector is first operated, utilizing the steam for heating the water so mixed and returning the latter to the stream of water being fed to the injector.

3. The method of economizing feed water being injected into a boiler by a steam jet which consists in draining from the injector and against atmospheric pressure only, the mixed steam and water not delivered to the boiler when the injector is first operated, utilizing the steam for heating the water, recirculating the latter in the stream of water by delivery to the inlet pipe of the injector, and delivering the combined stream through the injector to the boiler.

4. An economizer for feed water comprising a receiving tank, an inlet thereto, an atmospheric vent from the tank, a return pipe from the tank, said inlet and return pipe being adapted for direct connection to the waste discharge and inlet pipe respectively of an injector.

5. In combination, an injector having an inlet pipe, an outlet and a waste drain acting against atmospheric pressure only, an economizer comprising a receiving tank, inlet means connecting the tank with the waste discharge of the injector, and return means from the tank direct to the inlet pipe of the injector.

6. In combination, an injector having an inlet pipe, an outlet and a waste drain acting against atmospheric pressure only, an economizer comprising a receiving and storing tank, inlet means connecting the tank with the waste drain of the injector, return means from the tank direct to the inlet pipe of the injector and a vent from the tank to the atmosphere.

7. In combination, an injector having an inlet pipe, an outlet and a waste drain acting against atmospheric pressure only, an economizer comprising a receiving tank, an inlet thereto, a connection between the inlet and the waste drain of the injector, a vent from the tank to the atmosphere, a return pipe from the bottom of the tank, a liquid seal in said pipe and a connection between said pipe and the inlet pipe of the injector.

In testimony whereof, I affix my signature.

M. P. SHIELDS.